July 12, 1966 N. LAING 3,260,442
BLOWERS
Original Filed Sept. 8, 1961 11 Sheets-Sheet 1

INVENTOR
NIKOLAUS LAING
BY
ATTORNEYS

July 12, 1966  N. LAING  3,260,442
BLOWERS
Original Filed Sept. 8, 1961  11 Sheets-Sheet 2
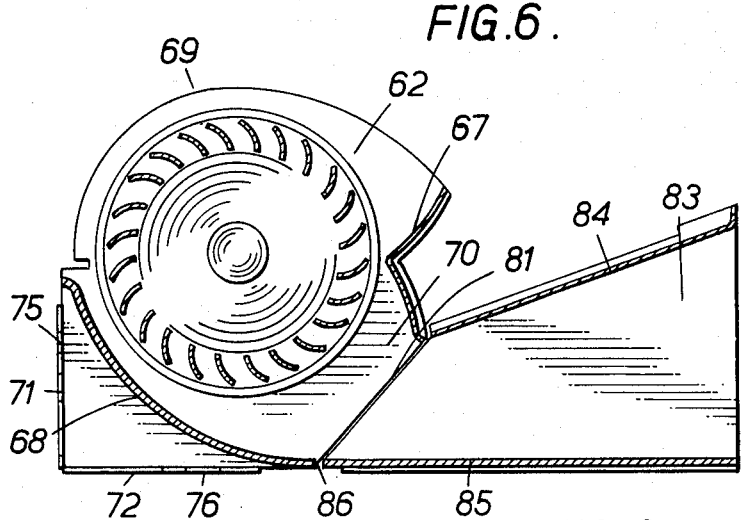
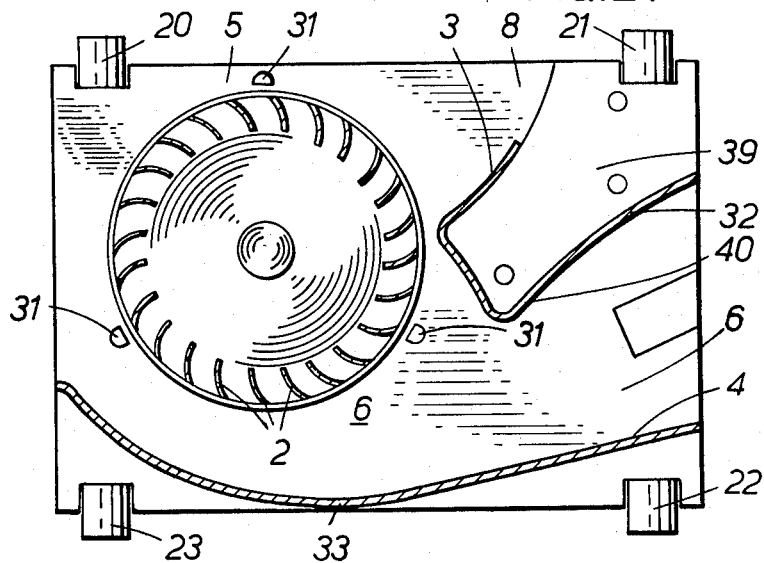
INVENTOR
NIKOLAUS LAING
BY
ATTORNEYS

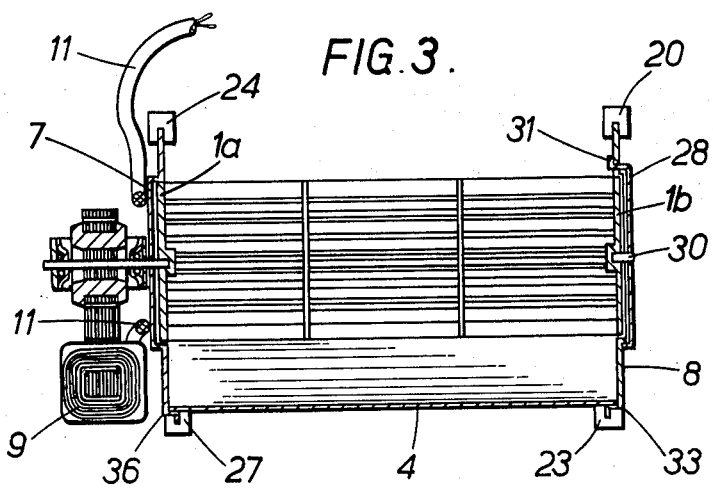
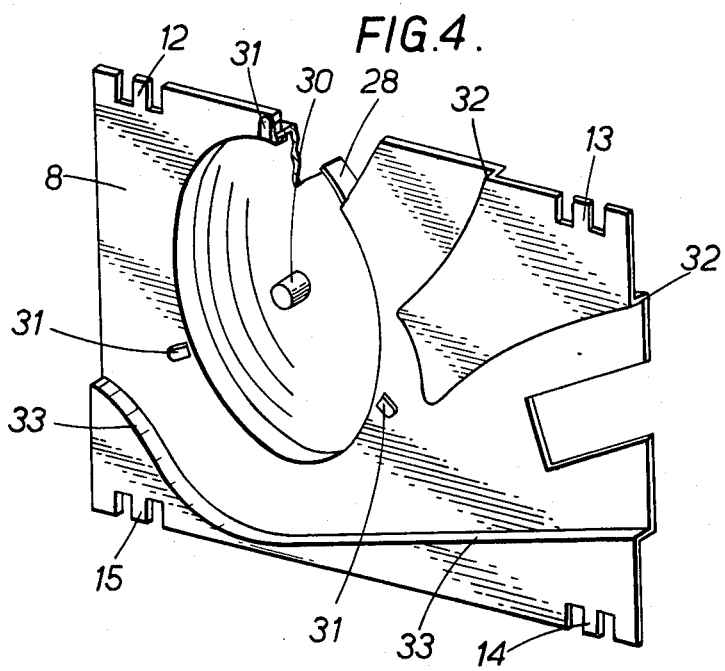

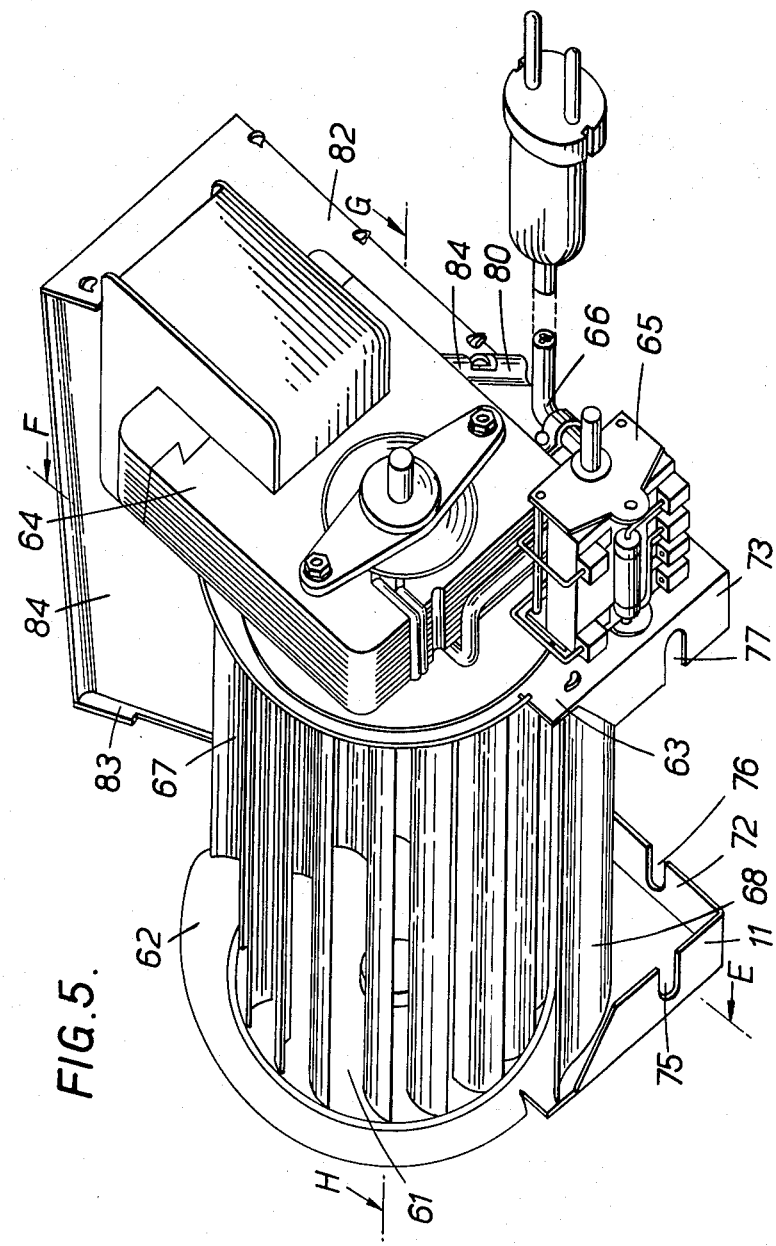

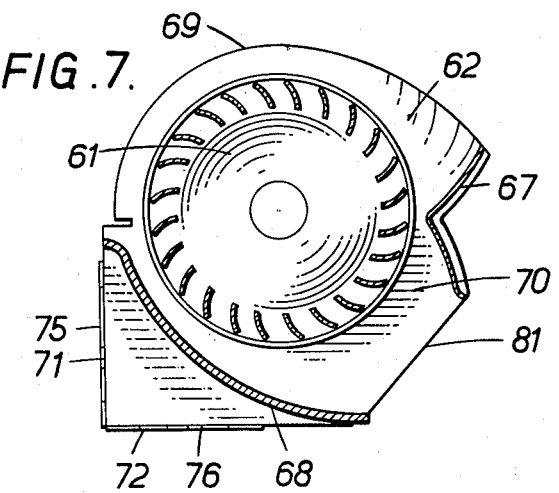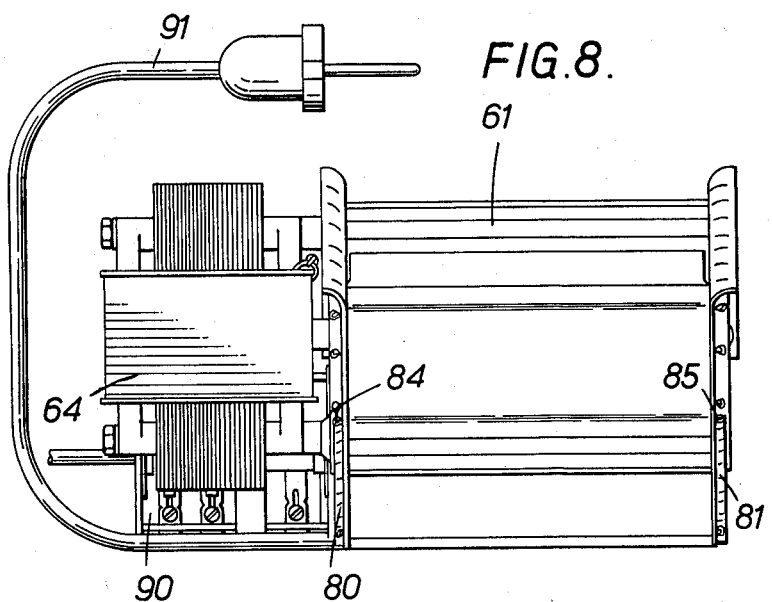

July 12, 1966 N. LAING 3,260,442
BLOWERS
Original Filed Sept. 8, 1961 11 Sheets-Sheet 6

INVENTOR
NIKOLAUS LAING
BY
ATTORNEYS

July 12, 1966            N. LAING            3,260,442
BLOWERS
Original Filed Sept. 8, 1961            11 Sheets-Sheet 7
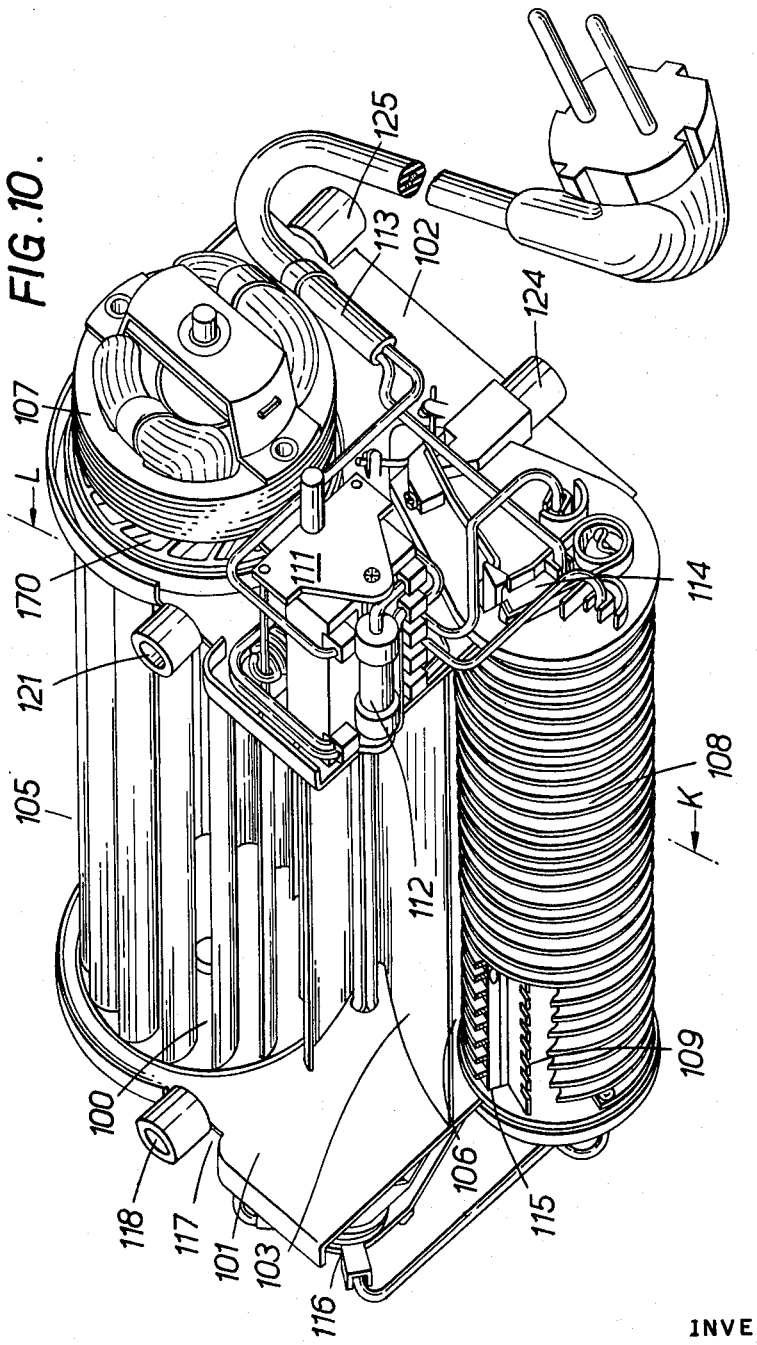
INVENTOR
NIKOLAUS LAING
BY
ATTORNEYS July 12, 1966  N. LAING  3,260,442
BLOWERS Original Filed Sept. 8, 1961  11 Sheets-Sheet 8

INVENTOR
NIKOLAUS LAING

ATTORNEYS

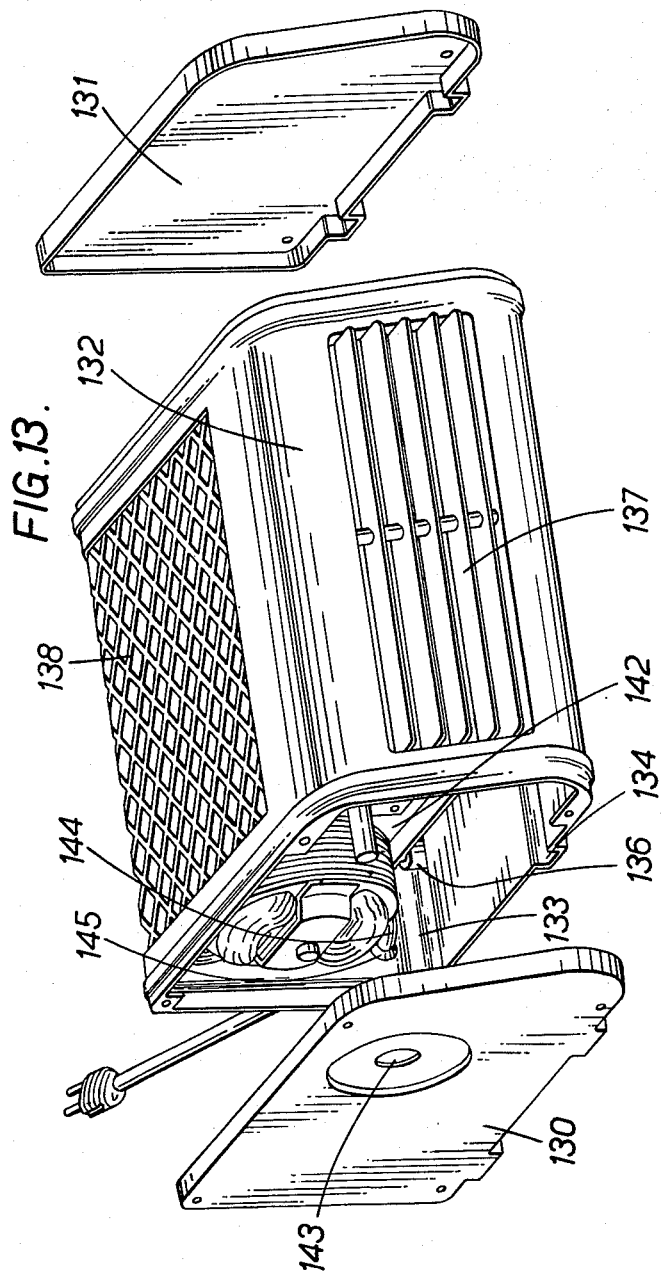

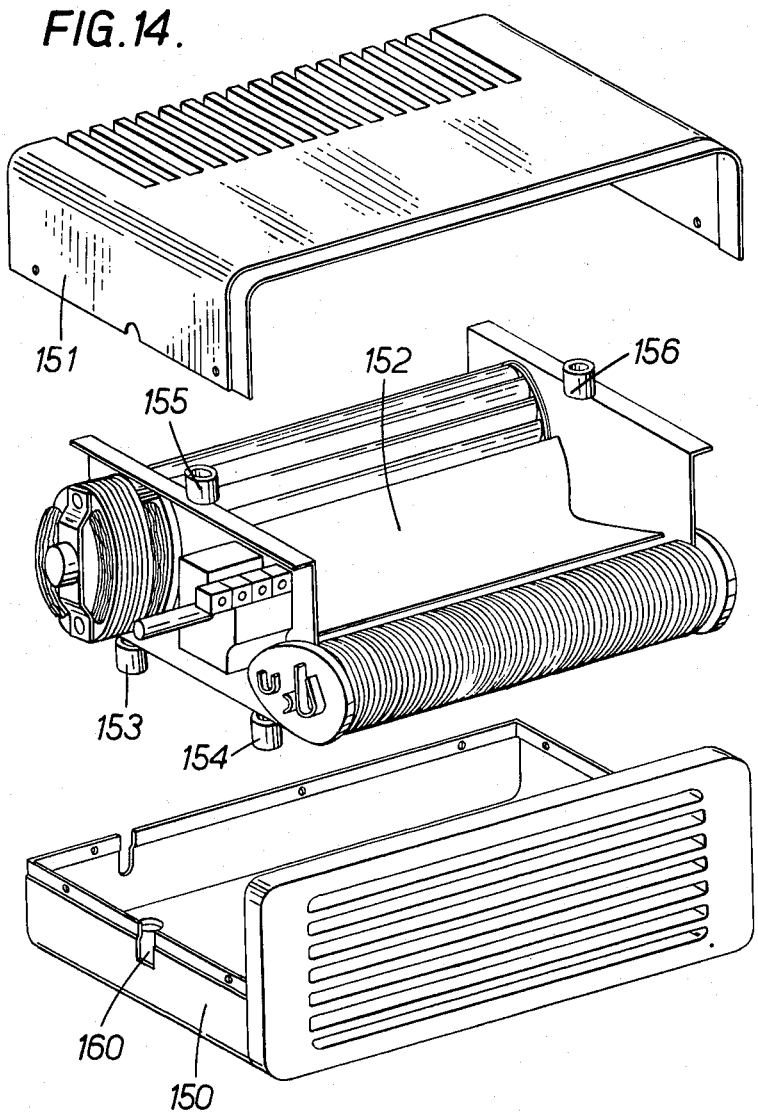

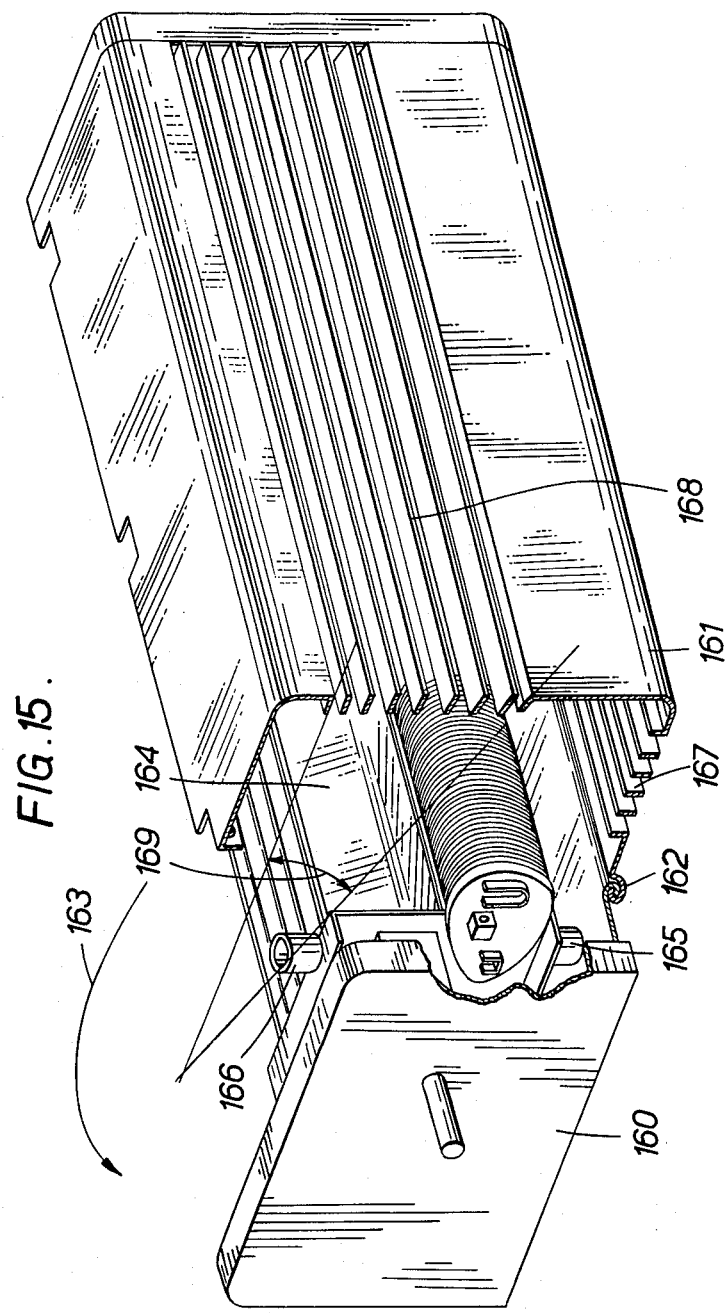

United States Patent Office 3,260,442
Patented July 12, 1966

3,260,442
BLOWERS
Nikolaus Laing, Addingen, near Stuttgart, Germany, assignor, by mesne assignments, to Laing Vortex, Inc., New York, N.Y.
Continuation of application Ser. No. 136,830, Sept. 8, 1961. This application Aug. 24, 1964, Ser. No. 401,748
Claims priority, application Germany, Sept. 8, 1960, L 37,000
15 Claims. (Cl. 230—117)

This application is a continuation of my application Serial No. 136,830, filed September 8, 1961, now abandoned.

This invention relates to domestic and like blowers and blower units of the cross-flow type, that is, incorporating a bladed cylindrical rotor and guide means co-operating with the rotor to induce on rotation thereof a flow of air from an inlet side of the rotor through the path of the rotating blades to the interior of the rotor and thence again through the path of the rotating blades to the outlet side of the rotor.

The invention is more specifically concerned with constructional features of the blowers and blower unit and its general object is to facilitate their production and assembly. The term "blower" is here used to denote a complete article of commerce, and the term "blower unit" to denote a sub-assembly thereof including all or substantially all the operating parts, but requiring to be assembled in a protective casing before being safely usable as a domestic or like article.

On important aspect of the invention is especially related to the assembly of the blower unit with its casing Essentially the blower unit comprises spaced opposed end walls and spaced opposed side walls interconnecting the end walls, a cylindrical bladed rotor mounted for rotation about its axis between the end walls, an electric motor driving the rotor, the side walls forming air flow guide means co-operating with the rotor on rotation thereof by said motor to set up a flow of air from the inlet side of the rotor through the path of the rotating blades to the interior of the rotor and thence again through the path of the rotating blades to the pressure side of the rotor. According to the invention, in this aspect thereof, the walls of the blower unit carry a series of outwardly projecting resilient non-metallic members, which when the unit is inserted in a casing, have pressure contact with opposite interior parts thereof, whereby to retain the unit in desired assembled position in the casing, all parts of the unit except the connecting members being out of contact therewith. By appropriate design the invention thus enables the elimination of all screwed, bolted or other conventional connections between the blower unit and its casing with a consequent major saving in time and trouble required for assembly of the blower and consequently in its final price. This aspect of the invention has however other advantages as well. The live electrical wiring to the motor, as well as to the heater commonly provided, is of course insulated from the metallic parts of the blower unit, but these parts will become live if the insulation is chafed or otherwise damaged. With conventional bolted or screwed connections between the blower unit and the casing, the latter will then also become live, and for this reason an earth connection will be desirable or in some places necessary for compliance with legal requirements. The resilient non-metallic connecting members of the present invention however insulate the outer casing and avoid this difficulty, together with the need for an earth connection. A further advantage of the connecting members is the sound insulation which they provide between the blower unit and the casing. The end walls of the unit are conveniently made of sheet metal, and have projecting fingers: the connecting members are conveniently tubular and are engaged over the fingers to project beyond them: however various other constructions are envisaged.

In another aspect, the invention is concerned with the construction of the blower unit itself, and provides that the end walls should have a set of locating ledges on their facing sides, which ledges receive the side walls of the unit. Now, cross-flow blower units are preferably, in commerce, manufactured and sold in a range of sizes. It is uneconomic to build a series of units all the parts of which are different from each other. The present invention in this aspect is based on the appreciation that a series of blower units of graded throughput may be made with identical parts except for the rotor and side walls: the rotor is made in sections and the different units of the series are made by adding sections to a rotor of given diameter and using correspondingly longer side walls of a constant cross-section. It is necessary therefore that the side walls should be simple to make by a method that does not require extensive tooling for each size. The invention in this aspect enables the side walls to be made from simple rectangles of sheet metal stamped to shape in a single pair of dies usable for all lengths; in assembly of the units all that is necessary is mate the side walls with the ledges on the end walls and secure the walls together, preferably directly at the ledges. The end walls can conveniently be made of sheet metal and spot-welded to the ledges.

In yet another aspect of the invention, also concerned with convenient assembly of the blower unit with the casing, the motor and all switching means are located on one end wall of the unit, so that on assembly with the casing no electrical connections need be made e.g. with electrical devices on the casing. Having the electrical elements on one end wall also facilitates the production of a range of blower units as mentioned in the last paragraph.

Various embodiments of the invention will now be described by way of example with reference to the accompanying drawings, in which:

FIGURE 2 is a cross-section taken on the line A–B in FIGURE 1;

FIGURE 3 is a cross-section taken on the line C–D in FIGURE 1;

FIGURE 4 shows a portion of the blower illustrated in FIGURE 1;

FIGURE 5 illustrates in perspective a second embodiment of the invention in which four connecting elements are provided, two on each end member, said locating elements being formed on adjacent edges and jutting out perpendicularly to the plane of the end members;

FIGURE 6 is a cross-section taken on the line E–F in FIGURE 5;

FIGURE 7 is the same cross-section as in FIGURE 6 after the diffuser has been removed;

FIGURE 8 is a view of the blower unit illustrated in FIGURE 5 seen from the pressure side after the diffuser has been removed;

FIGURE 10 shows a third form of blower unit in perspective view, in which a heating unit is located between the end members in front of the air outlet opening;

FIGURES 13, 14 and 15 show one way in which a blower unit according to the invention can be built into a casing.

Figure 1:
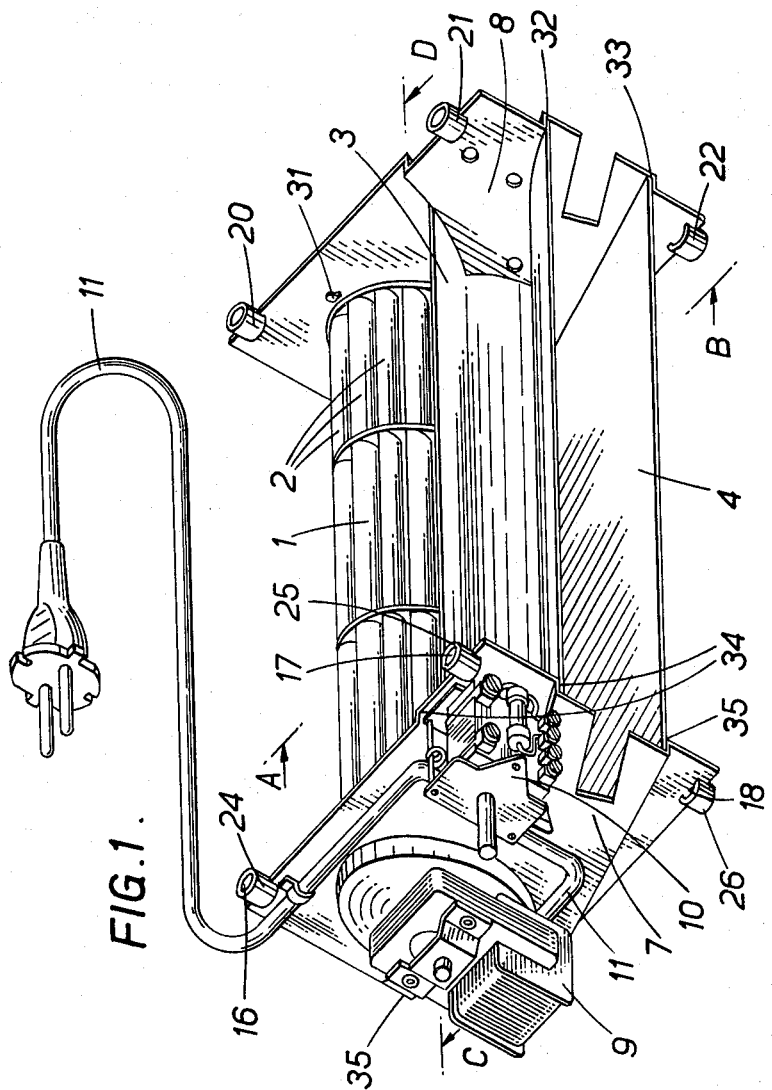
FIGURE 1 illustrates a first form of a blower unit, in perspective view, in which four connecting elements are provided on each end member, said elements being located in pairs of opposite edges.

FIGURE 1 shows a blower unit according to the invention with an elongated cylindrical rotor 1 fitted with a plurality of blades 2 on its periphery extending over the entire axial length of the rotor between supporting end discs 1a, 1b. 3 and 4 are two side wall members which likewise extend along the entire length of the rotor and which are spaced from the rotor periphery on either side thereof, as will clearly be seen by reference to the cross-section shown in FIGURE 2. The two wall members 3 and 4 define an intake opening 5 which extends around nearly half the rotor circumference. On the opposite or delivery side of the rotor they define an outlet duct 6 for the delivery of the air. The blower is provided with two end members 7 and 8 which are perpendicular to the said side wall members 3 and 4. End member 8 is separately shown in FIGURE 4. The two side wall members 3 and 4 are attached to these end members 7 and 8, as will be further explained below. An electric motor 9 for driving the rotor 1, a switch 10 for starting and stopping the motor and an electric supply cable 11 for supplying the motor with current are all attached to this one end member 7. Rotor 1 is mounted, on the one hand, on the shaft of the motor 9 and, on the other, on an axis pin 30 in the end member 8 as will be readily seen in the cross-section shown in FIGURE 3.

The two end members 7 and 8 are each provided with four locating elements located in pairs on opposite edges thereof: one locating element is not visible, being hidden from sight in FIGURE 1 by the motor, and the remainder are designated 12 to 18. As will be seen from FIGURES 1 to 4, the end members 7 and 8 are of sheet metal and the locating elements are integral finger-like extensions of the end members. The locating elements 12 to 18 are enclosed in tubular caps 20 to 27 consisting of an electrically and acoustically insulating material, the locating elements 12 to 18 being completely surrounded by these caps. These locating elements 12 to 18 are so contrived that, with their caps 20 to 27, they can engage co-operating receiving elements in a casing, as will be described in greater detail when discussing FIGURES 13 to 15. The blower unit is safely located in its casing exclusively by these locating elements and no additional fixing means or screws are required. When the blower unit has been assembled inside its casing the caps 20 to 27 therefore intervene between the locating elements 12 to 18 and the relative receiving elements of the casing. The entire blower unit is thus electrically and acoustically insulated from its casing. Suitable materials for the caps 20 to 27 are rubber or a synthetic plastic material. End member 8 has a circular opening opposite rotor 1 which can be inserted through this opening when the blower is being assembled, or withdrawn therethrough if it should be necessary subsequently to replace it. When the blower has been assembled the opening is closed by a cover 28 which at its centre carries the above-mentioned pin 30 for mounting the non-driven end of rotor 1. The rotor bearing formed by pin 30 may with advantage be suspended elastically. To this end the entire cover 28 may be made of an elastic material, such as a plastic, permitting any misalignment between motor and rotor bearings to be compensated. In forms of construction comprising a very short rotor the provision of pin 30 and of the bearing it forms can be dispensed with and the rotor simply overhung on the end of the motor shaft. Cover 28 is so formed that the rotor 1 can here project into the plane of end member 8. A similar recess is provided at the other end in end member 7. As will readily be seen in FIGURE 3 the ends of the rotor project into these recesses so that those portions of the end members 7 and 8 which define the edges of the outlet duct 6 for the air are substantially located in the plane of the end discs 1a, 1b of the rotor. A discontinuity in the surface which guides the air at the point where it enters the outlet duct 6 upon leaving the rotor 1 is thus avoided. Cover 28 is affixed in the manner specially shown in FIGURES 3 and 4 by means of lug-like extensions around its periphery. For the reception of these extensions slits are provided in end member 8. When the cover is assembled the extensions 31 are pushed through the slits and then bent down, thereby retaining the cover in the illustrated position.

The side wall members 3 and 4 are suitably shaped to comply with the required aerodynamic conditions. In order to permit these wall members 3 and 4 to be reliably and securely fitted in the desired position between the end members the latter are formed with offset shoulders as shown at 32, 33, 34 and 35 corresponding with the shape of the wall portions. The shoulders thus provide narrow ledges in the end members extending parallel with the surface of the wall portions. The wall portions are affixed to these ledges by spot welds and thus secured in the position which is clearly shown in FIGURE 2.

It will be seen that the clearance between side wall member 4 and the rotor everywhere exceeds three times the radial depth of the blade 2, whereas a projecting part of side wall portion 3 approaches the rotor periphery to a distance equal to about one radial depth of a rotor blade and then sweeps back away from the rotor periphery towards the air outlet duct to form a second corner 40 where the two side wall portions 3 and 4 form a throat. The distance between side wall portions 3 and 4 then increases again to form a divergent outlet duct for the air. If desired an electric heating unit may be located inside the outlet duct between the two side wall portions 3, 4.

The second embodiment illustrated in FIGURES 5 to 9 likewise comprises an elongated barrel type rotor 61 mounted between two end members 62 and 63. Affixed to one end member 63 outside the air stream generated by the fan are the electric motor 64 with a switch 90, and an electric supply cable 91 for the motor. Provided at the periphery of rotor 61 between the two end members 62 and 63 are two side wall portions 67 and 68 which on one side define an intake opening 69 and on the opposite side an outlet duct 70 through which the rotor delivers the air. The end members 62, 63 are formed with projections 71 to 74 located in pairs on adjacent edges from which they jut out at an angle of 90° to the end members. Each of these projections has a recess 75 to 77 for the reception of bolts or rivets to secure the blower to its casing. The edges of the end members 62 and 63 are formed with means 80 and 81 for detachably securing wall portions 82 to 85 which lengthen the air outlet duct 70 to form a diffuser. These additional wall portions 82 to 85 can be optionally fitted according to the purpose for which the blower is intended. For instance, if the space available for the accommodation of the blower is very confined, then the diffuser formed by wall portions 82 to 85 can be removed and the aerodynamic advantages gained by the provision of a diffuser relinquished.

The guide means 80, 81 are contrived for reception of the respective wall portions in sliding engagement. The guide means 80, 81 are provided by outwardly offsetting the rear edges of the end members to form rails into which corresponding rails on the lateral wall portions 82 and 83 can be inserted. The lateral wall portions form extensions of the side members 62 and 63 when the diffuser has thus been fitted. When the diffuser 82 to 85 has been fitted a narrow gap 86 is formed between wall portion 68, on the one hand, and wall portion 85 which forms an extension thereof, on the other. The presence of this gap has a favourable effect on the conditions of air flow. FIGURES 5 and 6 show the blower unit with the diffuser in place, whereas FIGURES 7 and 8 show the appliance without the diffuser.

Figure 9:
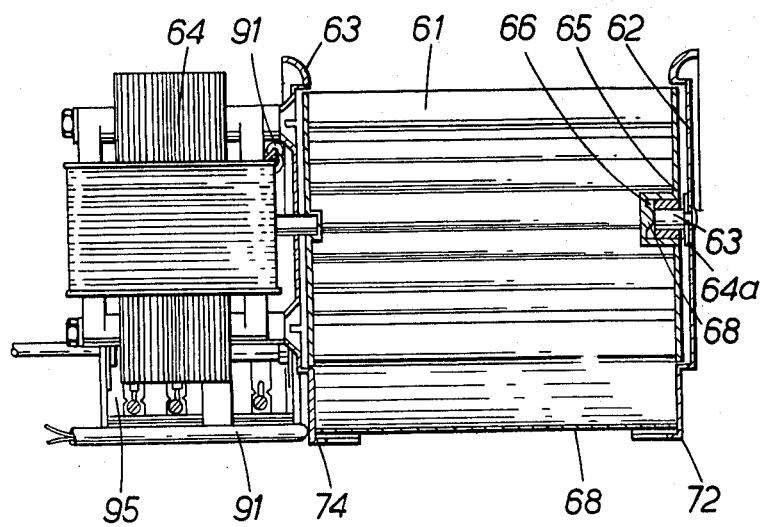
FIGURE 9 is a cross-section taken on the line G–H in FIGURE 5.

As will be understood by reference to FIGURE 9 the rotor 61 is mounted at one end on the motor shaft and at the other end in the opposite end wall 62. In order to provide a bearing this end wall 62 contains a disc 64a made of spring steel riveted to end wall 62 by a headed pin 63. The cylindrical shaft of the pin 63 carries a self-lubricating sinter metal bush 65 in a bush 66 on the end plate 67 of the barrel rotor 61. The rotor is axially retained by a boss 68 in bush 66 bearing against the end of pin 63. Instead of making bush 65 of a sintered metal it may consist of a low-friction plastic material such as a tetrafluorocarbon.

Figure 10A:
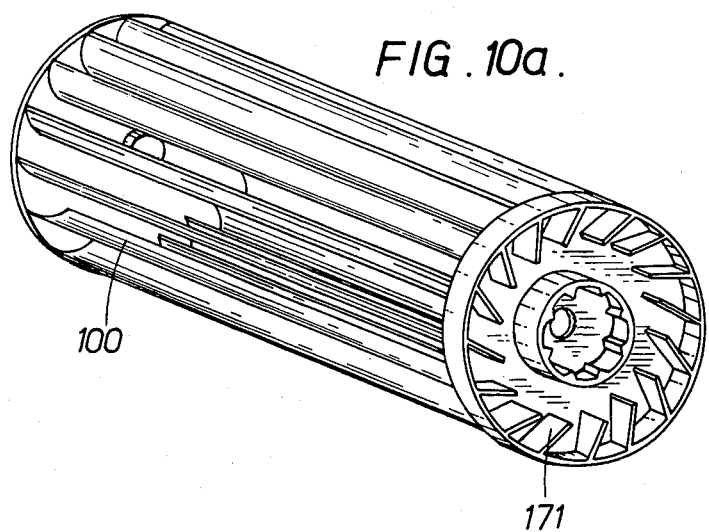
FIGURE 10a is a separate perspective view of the rotor in the FIGURE 10 blower unit.
Figure 11:
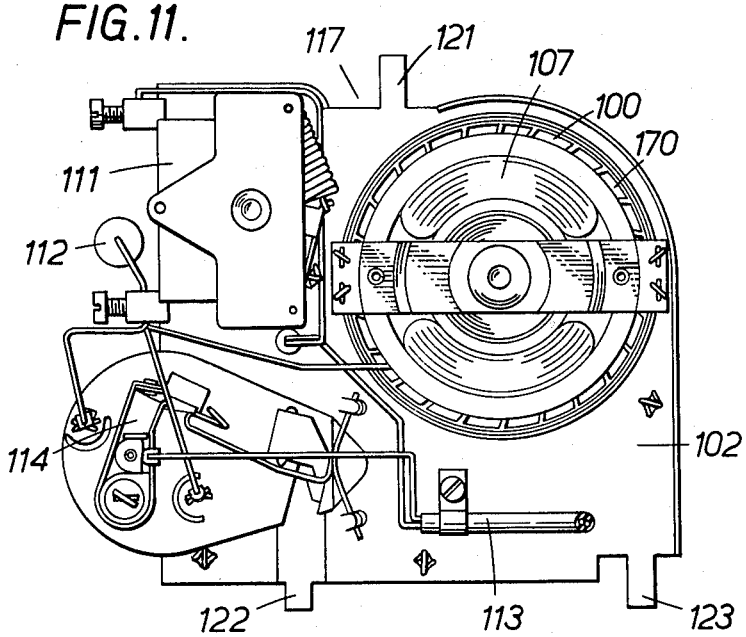
FIGURE 11 is a side view of the blower unit of FIGURE 10.
Figure 12:
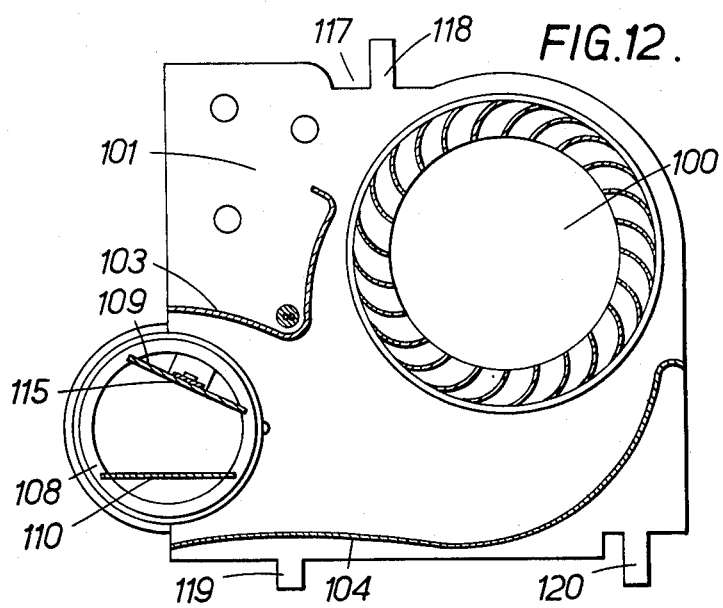
FIGURE 12 is a section parallel with the line K–L in FIGURE 10.

In the third embodiment shown in FIGURES 10 to 12 reference 100 indicates a barrel rotor mounted between the two sheet metal end members 101 and 102. Two sheet metal side wall portions 103 and 104 are provided adjacent the rotor periphery and these again define an intake opening 105 as well as an outlet duct 106 on the opposite side. The ends of these wall portions are secured to the end members. Moreover, attached to end member 102 is the electric motor 107 for driving the fan and one end of rotor 100 is mounted on the shaft of the motor, whereas the other end of the rotor is mounted in end member 101. For cooling the motor 107 end member 102 has an opening 170 which is completely circular and aligns with the end face of rotor 100. FIGURE 10a shows rotor 100 separately and in perspective, and it will be seen that the said end of the rotor carries a supplementary blading 171 on its outside face. This blading circulates secondary air which fans and cools the motor 107. Between the two end members 101 and 102 in alignment with the outlet duct is a heating unit 108 consisting of electric resistance wires coiled on two formers 109 and 110 made of an insulating material. The ends of the two formers 109 and 110 are fixed to the end members 101 and 102. End member 102 also carries a switch 111 which can be placed into at least three different operative positions, one for cutting off the heater and stopping the motor, a second for starting the motor whilst the heater element remains cut off and a third in which both the motor and the heater are on. A fourth position may be provided in which the motor is on and the individual elements of the heater are connected in parallel to provide maximum heating effect. In the latter case, which is represented by the present embodiment, the motor 107 is connected with the mains through a series resistor when the switch is in the third position in which the heater is operated for medium heating effect, so that the motor will then also run at reduced speed and the blower unit delivers a smaller volume of air at this lower speed to accord with the reduced generation of heat. The electric supply cable 113 is likewise attached to end member 102. Located on each end member 101 and 102 is a thermostatic switch 114 and 115 respectively which automatically operates whenever the heat generated by the heating element exceeds a preset temperature at the point of location of the respective switch. The two switches which are of like construction are connected in series in the electric supply line of the heater. If the temperature near the heater for any reason whatsoever exceeds a permissable limit, then the thermostatic switch 114 or 115 whichever is closer to the point of excessive temperature will operate and cut the supply of current to the heater. The switches are so constructed that they cannot automatically reclose. Another thermostatic switch 116 is located on end member 101 in the stream of ambient air drawn in by rotor 100 for this purpose end member 101 contains a recess 117 through which the intake air can fan switch 116 and cool motor 107 even if one casing wall is in direct contact with the end members 101 and 102. This switch might also be located in side wall member 103 on the side facing away from the heater. Switch 116 is likewise included in the supply line to the heater and serves for automatically switching off the heater when the temperature of the intake air exceeds a given temperature. When this ceases to be the case this switch automatically restores the current supply to the heater. The switch is equipped with adjusting means which permit the required ambient temperature at which the switch will cut the heater supply to be manually preset from the outside. Each of the two end members 101 and 102 is provided with four projections 118 to 123, two on the bottom edges and two at the top. These projections jut out beyond the general contour of all the parts of the blower and, as will be seen by reference to FIGURE 10, they are provided with enveloping caps 126, 127 made of rubber which extend outwardly beyond the projections. In FIGURES 11 and 12 these caps are not shown.

The manner in which blower units as above described can be built into their casings will now be described by reference to FIGURES 13 to 15. The blower units, which themselves include all the necessary electrical equipment, may or may not be provided with an electric heater according to whether the complete appliance is to be used as a simple ventilating fan or as a fan with a supplementary heater, that is to say as a circulating air heater.

The casing shown in FIGURE 13 consists of three parts, namely two sides 130, 131 and a generally prismatic centre part 132. This centre part 132 is formed with two channels 133, 134 for engagement of the correspondingly located projections, of which only projection 136 can be seen in the drawing, when the blower unit 142 is slid sideways into the centre part as shown. The unit 142 is held in position by projections which cannot be seen, but which bear against the underside of the top of centre part 132. When the unit 142 has thus been inserted, the two sides 130 and 131 of the casing are secured to the ends of the prismatic centre portion 132. For the switch and the supply cable 144 openings 143 and 145 are provided in the casing. The centre casing part 132 is also provided with an elongated outlet opening 137 through which the air can blow out and an inlet opening 138 through which the air can enter. Both openings 137 and 138 are closed by grilles. In the embodiment according to FIGURE 14 the casing consists of only two parts 150 and 151 for containing the blower unit. Three projections of which only the projections 153 to 156 can be seen engage suitably located co-operating members inside the casing. Of these members only 159 can be seen. The projections 153 to 156 are held in the co-operating members when the two parts 151 and 150 are bolted together.

In the embodiment illustrated in FIGURE 15 the casing comprises two parts 160 and 161 connected together by a hinge 162 which permits part 161 to be swung into closing position as indicated by arrow 163. When the casing has thus been closed the blower unit 164 inside the casing bears with its holding elements, of which only holding elements 165 and 166 can be seen, against the inside of the casing walls. Once again the outlet opening 167 and the entry opening 168 are elongated and both closed by a grille. The bars of the grille in the intake window are not parallel but are located to define acute angles between them in such manner that the angle enclosed by the two outer channels is the acute angle indicated at 169.

In all the embodiments illustrated, the elastomeric caps can be made of rubber or synthetic rubber, P.V.C., polythene, soft nylon or similar synthetic materials.

I claim:

1. A blower comprising a blower unit of the cross-flow type and a casing enclosing the blower unit and having inlet and outlet openings for flow of air to and from said unit, the blower unit comprising spaced opposed end walls and spaced opposed side walls interconnecting the end walls, a cylindrical bladed rotor mounted for rotation about its axis between the end walls, an electric motor driving the rotor, the side walls forming air flow guide means co-operating with the rotor on rotation thereof by said motor to set up a flow of air from the inlet side of the rotor through the path of the rotating blades to the interior of the rotor and thence again through the path of the rotating blades to the pressure side of the rotor, said walls carrying a series of outwardly projecting resilient non-metallic members in pressure contact with opposite interior parts of the casing to locate the blower unit therewithin and to provide electrical and sound insulation between the casing and the blower unit.

2. The blower claimed in claim 1, wherein at least three of said resilient non-metallic members are located on each end wall and project in the general plane thereof.

3. The blower claimed in claim 2, wherein the resilient non-metallic members are tubular and are slid over locating projections integral with the end walls.

4. For insertion within a casing providing inlet and outlet openings, a blower unit comprising spaced opposed end walls and spaced opposed side walls interconnecting the end walls, a cylindrical bladed rotor mounted for rotation about its axis between the end walls, an electric motor driving the rotor, the side walls forming air flow guide means co-operating with the rotor on rotation thereof by said motor to set up a flow of air from the inlet side of the rotor through the path of the rotating blades to the interior of the rotor and thence again through the path of the rotating blades to the pressure side of the rotor, said walls carrying a series of outwardly projecting resilient non-metallic members for pressure contact with opposite interior parts of the casing to locate the blower unit therewithin and to provide electrical and sound insulation between the casing and the blower unit.

5. The blower unit claimed in claim 4, wherein each end wall provides pairs of locating edge portions and one of said resilient non-metallic members is located upon each of said pairs of edge portions.

6. The blower unit claimed in claim 5, wherein the locating edge portions of each pair are provided by a tongue integral with the corresponding end wall and each of the resilient non-metallic members has a tubular end push-fitted over one of said tongues.

7. The blower unit of claim 4, wherein at least one opposed pair of said walls are of sheet metal providing outwardly projecting fingers and said resilient non-metallic members have tubular ends engaged over the fingers and projecting beyond them.

8. A fan comprising: a fan unit having a pair of spaced generally parallel end walls, a pair of side walls connected to and extending between the end walls in spaced relation to one another, an electric motor mounted at one end wall, a cylindrical impeller coaxial with and driven by the motor and extending between the end walls in parallel relation to the side walls, said impeller having a series of blades extending parallel to the axis and arranged in a ring thereabout to define an interior space, said impeller on rotation in a predetermined direction co-operating with the side walls to induce a flow of air from one side of the impeller through the path of the rotating blades to the interior space and thence again through the path of the rotating blades to another side of the impeller; and a casing formed in at least two parts secured together and enclosing the fan unit, the casing having inlet and outlet openings for passage of air to and from the air impeller; and at least three connecting elements of an elastic non-metallic material located on each end wall of the fan unit and contacting opposite interior parts of the casing and insulating the casing from the unit, the end walls being of sheet metal and including upstanding finger portions and said connecting elements being tubular and longer in length than the fingers and being engaged thereover to project away from the end walls in the general plane thereof.

9. A fan comprising: a fan unit having a pair of spaced generally parallel end walls, a pair of side walls connected to and extending between the end walls in spaced relation to one another, an electric motor mounted at one end wall, a cylindrical impeller coaxial with and driven by the motor and extending between the end walls in parallel relation to the side walls, said impeller having a series of blades extending parallel to the axis and arranged in a ring thereabout to define an interior space, said impeller on rotation in a predetermined direction co-operating with the side walls to induce a flow of air from one side of the impeller through the path of the rotating blades to the interior space and thence again through the path of the rotating blades to another side of the impeller; and a casing formed in at least two parts secured together and enclosing the fan unit, the casing having inlet and outlet openings for passage of air to and from the air impeller; and at least three connecting elements of an elastic non-metallic material located on each end wall of the fan unit and contacting opposite interior parts of the casing and insulating the casing from the unit, the end walls being of sheet metal and including within their contour oppositely projecting edges and said connecting elements being located on said edges and extending beyond said contour.

10. A fan comprising: a fan unit having a pair of spaced generally parallel end walls, a pair of side walls connected to and extending between the end walls in spaced relation to one another, an electric motor mounted at one end wall, a cylindrical impeller coaxial with and driven by the motor and extending between the end walls in parallel relation to the side walls, said impeller having a series of blades extending parallel to the axis and arranged in a ring thereabout to define an interior space, said impeller on rotation in a predetermined direction co-operating with the side walls to induce a flow of air from one side of the impeller through the path of the rotating blades to the interior space and thence again through the path of the rotating blades to another side of the impeller; and a casing formed in at least two parts secured together and enclosing the fan unit, the casing having inlet and outlet openings for passage of air to and from the air impeller; and at least three connecting elements of an elastic non-metallic material located on each end wall of the fan unit and contacting opposite interior parts of the casing and insulating the casing from the unit, said casing including a removable end and said opposite parts thereof providing channels to receive the connecting elements for assembly of said casing and unit by sliding the unit into the casing from the open end thereof with the connecting elements sliding along the channels.

11. A blower unit comprising a pair of spaced opposed end walls defining on the facing sides thereof a set of locating ledges, a pair of spaced opposed sheet metal side walls having end edge portions locating upon said ledges on the end walls and secured thereto, a bladed cylindrical rotor extending between the end walls and mounted for rotation about its axis, and a motor driving the rotor, the side walls forming flow guide means co-operating with the rotor on rotation thereof to induce a flow of air from one side of the rotor through the path of the rotating blades thereof to the interior of the rotor and thence again through the path of the rotating blades to another side of the rotor.

12. A blower unit as claimed in claim 11, wherein the end walls provide a continuous ledge for each end edge portion of the side walls, each of said end edge portions overlying the corresponding ledge over substantially its whole extent.

13. A blower unit as claimed in claim 11, wherein in any section through the rotor axis the side walls appear as lines parallel to the rotor axis.

14. A blower unit as claimed in claim 11, wherein the end walls are of sheet metal and said ledges are pressed therein.

15. A blower unit as claimed in claim 11, wherein the end edge portions of the side walls are directly secured to said ledges.

References Cited by the Examiner

UNITED STATES PATENTS

| | | | |
|---|---|---|---|
| 1,823,579 | 9/1931 | Anderson | 230—125 |
| 2,631,776 | 3/1953 | Palmer | 230—232 |

(Other references on following page)

| | UNITED STATES PATENTS | | | |
|---|---|---|---|---|
| 2,686,630 | 8/1954 | Burrowes | 230—235 X |
| 2,800,272 | 7/1957 | McKee | 230—232 X |
| 2,822,674 | 2/1958 | Simmons | 230—125 X |
| 2,843,718 | 7/1958 | Huck | 219—368 |
| 2,942,773 | 6/1960 | Eck | 230—117 X |

FOREIGN PATENTS 225,767   1/1958   Australia.

SAMUEL LEVINE, *Primary Examiner.*

DONLEY J. STOCKING, *Examiner.*

R. M. WALKER, H. F. RADUAZO, *Assistant Examiners.*